United States Patent [19]

Finger

[11] 4,217,924
[45] Aug. 19, 1980

[54] CLEANING SYSTEM HAVING STEAM AND WATER MIXING EJECTOR

[76] Inventor: John F. Finger, 308 S. Third St., Beresford, S. Dak. 57004

[21] Appl. No.: 858,882

[22] Filed: Dec. 8, 1977

[51] Int. Cl.² ............................................. F16K 49/00
[52] U.S. Cl. ..................................... 137/334; 137/335; 137/341; 137/895; 134/102; 134/107
[58] Field of Search ............... 137/334, 335, 337, 341, 137/3, 336, 604, 566; 134/102, 107

[56] References Cited

U.S. PATENT DOCUMENTS

| | | | |
|---|---|---|---|
| 382,147 | 5/1888 | Farrar | 134/102 |
| 2,128,263 | 8/1938 | Ofeldt | 137/336 |
| 2,604,854 | 7/1952 | Taylor | 137/335 |
| 2,624,618 | 1/1953 | Gelles et al. | 134/102 |
| 2,919,070 | 12/1959 | Arant | 134/102 |
| 3,049,302 | 8/1962 | Simmons, Jr. | 134/107 |
| 3,115,158 | 12/1963 | Sheppard | 137/604 |
| 3,334,657 | 8/1967 | Smith et al. | 137/604 |
| 3,595,268 | 7/1971 | Archer | 137/604 |
| 3,719,191 | 3/1973 | Zimmerly | 134/102 |
| 3,799,184 | 3/1974 | Conlee | 137/94 |
| 3,817,272 | 6/1974 | Finger | 137/334 |
| 3,870,228 | 3/1975 | Mosley, Jr. | 137/604 |
| 3,921,651 | 11/1975 | Weihe, Jr. | 134/57 DL |

Primary Examiner—Martin P. Schwadron
Assistant Examiner—A. Michael Chambers
Attorney, Agent, or Firm—Merchant, Gould, Smith, Edell, Welter & Schmidt

[57] ABSTRACT

A venturi-type ejector for delivering cleaning liquid to an article to be cleaned and having cold and hot liquid inlets; a high pressure pump for delivering cold liquid to the cold liquid inlet; a boiler for heating liquid and having an outlet for connection to the hot liquid inlet; and a low pressure pump for delivering liquid to the boiler. A pair of motors are connected each to a different pump and are controlled to cause cold or hot fluids to be delivered to the ejector for ejection therefrom separately or together, selectively. Control elements are included for controlling operation of the boiler responsive to flow of liquid to the boiler and to temperature of fluid discharged from the boiler.

8 Claims, 3 Drawing Figures

CLEANING SYSTEM HAVING STEAM AND WATER MIXING EJECTOR

This invention is in the nature of a system for cleaning of vehicles, other mechanisms and parts thereof by the application thereto of fluids under high pressure, and more particularly to such a system by means of which fluids, such as hot and cold water, and steam, may be used in combination, or separately, in a cleaning operation.

Heating devices, such as boilers, are known, as are pumps for delivering liquids at high pressure, to articles to be cleaned. Further, venturi-type fluid ejectors are known, an example being disclosed in U.S. Pat. No. 3,921,651 relating to a pot-washing machine. An important object of this invention is the provision of a cleaning system by means of which steam, hot water or cold water may be selectively produced under high pressure for the cleaning operation.

SUMMARY OF THE INVENTION

The cleaning system of this invention involves a pair of respectively relatively low and relatively high pressure pumps adapted to deliver cold water from a cold water source, pump operating means for said pumps, control means for said pump operating means, a boiler having an inlet and an outlet, conduit means for delivering water from said low pressure pump to said boiler inlet, and an ejector. The ejector includes a housing defining a chamber, a relatively small diameter high pressure inlet passageway to one side of the chamber, a relatively large diameter outlet passageway from the opposite side of said chamber and aligned with said high pressure inlet passageway, and a lower pressure inlet to said chamber angularly displaced from said inlet and outlet passageways. Further included is a second conduit means for delivering cold water from the high pressure pump to the high pressure inlet passageway, and third conduit means connecting said boiler outlet to said lower pressure ejector inlet. The pumps are operative to deliver both steam and cold water together, and selectively, cold water alone and steam alone, to said ejector chamber.

DETAILED DESCRIPTION OF THE PREFERRED EMBODIMENTS

Figure 1:
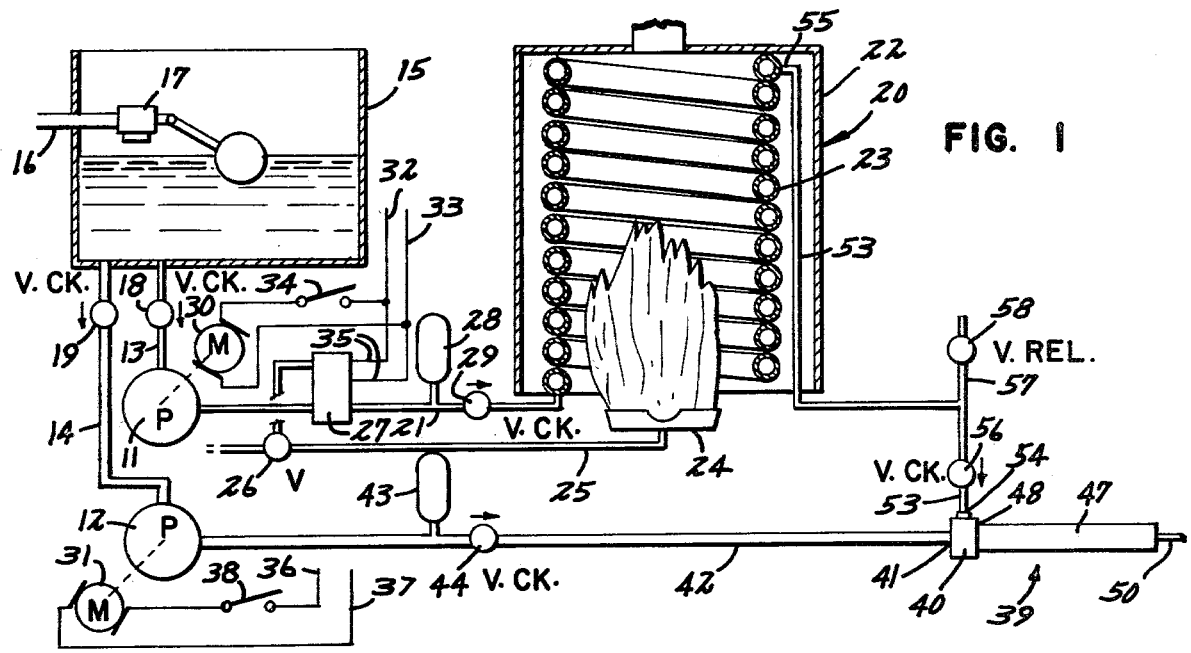
FIG. 1 is a view partly diagrammatic and partly in vertical section of a cleaning system produced in accordance with this invention.
Figure 2:
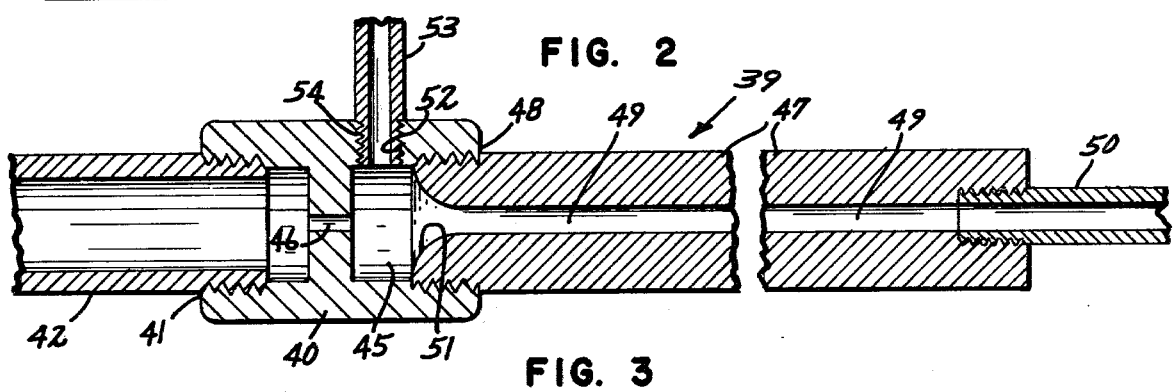
FIG. 2 is an enlarged fragmentary longitudinal section of the venturi-type ejector of this invention.

In the embodiment illustrated in FIGS. 1 and 2, a pair of pumps 11 and 12 are shown as having inlet conduits 13 and 14 respectively that are connected to a fluid reservoir 15 that is adapted to receive liquid, such as water, from a suitable source, not shown, but through a delivery pipe 16 and a conventional float operated valve 17. A pair of check valves 18 and 19 are interposed in the inlet conduits 13 and 14 respectively.

For the purpose of the present example, the pump 11 may be a relatively low volume pump having a delivery pressure up to approximately 100 pounds per square inch, the pump 12 being a high pressure pump for delivery of liquid, such as water, at 2,000 pounds per square inch or higher for high velocity discharge through a nozzle, not shown. The pump 11 is operative to deliver water to the inlet end portion of a boiler 20, through a conduit 21, the boiler 20 comprising an outer housing 22, a heating coil 23, and a burner 24. The burner 24 receives liquid or gaseous fuel from a suitable source, not shown, through a supply pipe 25 in which is interposed a fuel control valve 26 that is operated by a flow switch diagrammatically shown and indicated at 27, the flow switch being of the general type disclosed in U.S. Pat. No. 3,799,184 and interposed in the conduit 21. The valve 26 is one that is conventionally used, and detailed description thereof is omitted in the interest of brevity. Also interposed in the conduit 21 between the flow operated switch 27 and the inlet end of the boiler is a conventional surge tank or bottle 28 and a one-way check valve 29.

The pumps 11 and 12 are shown as being driven by respective motors 30 and 31, the motor 30 being connected to a power line, not shown, by leads 32 and 33, in the former of which is interposed a switch 34. Branch leads 35 connect the flow operated switch 27 in the circuit to the motor 30. In similar manner, the motor 31 is connected to a pair of power leads 36 and 37, a control switch 38 shown as being interposed in the lead 36.

A venturi-type ejector is shown in detail in FIG. 2, and is indicated generally at 39. The ejector 39 comprises a main body 40 having an inlet end 41 to which is rigidly connected a conduit or pipe 42 that extends from the high pressure pump 12. A surge tank or bottle 43 is connected to the conduit 42, and a one-way check valve 44 is interposed in the conduit 42 between the surge tank 43 and ejector 39. The ejector body 40 defines a generally cylindrical chamber 45 which communicates with the conduit 42 by means of an axial inlet passageway 46. An elongated tubular member 47 has an inner end portion that is screw threaded into the outlet end 48 of the ejector body 40, and defines an outlet passageway 49 that is substantially larger in diameter than the inlet passageway 46 and axially aligned therewith. At its opposite end, the tubular member 47 is screw threaded to receive one end of a discharge conduit 50 which may be assumed to be connected at its opposite end to a nozzle for directing liquid to an article to be cleaned or washed. The inner end of the outlet passageway 49 is formed to provide a bell-shaped wall surface portion 51 that flares outwardly from the passageway 49 and opens into the chamber 45. In the embodiment illustrated, the diameter of the outlet passageway 49 is substantially twice that of the inlet passageway 46.

Intermediate the inlet and outlet passageways 46 and 49, the ejector body 40 is provided with a screw-threaded opening 52 that extends radially through the cylindrical wall of the chamber 45 to provide a low pressure inlet opening into the chamber 45. A low pressure conduit 53 has its outlet end 54 screw threaded in the inlet opening 52, and has an inlet end 55 that is connected to the outlet end of the heating coil 23. A check valve 56 is interposed in the low pressure conduit 53. A branch conduit 57 extends from the low pressure conduit 53, and includes a pressure relief valve 58, the branch conduit being connected to the conduit 53 between the heating coil 23 and check valve 56. Preferably, the branch conduit 57 extends to a point where the fluid escaping through the check valve 58 is discharged to atmosphere or to a suitable receptacle, not shown.

The boiler 20 is in fact a steam generator, and is disposed to generate steam in the neighborhood of 325° F. When the pump 11 is energized to feed water to the boiler 20, steam will be discharged through the low pressure conduit 53 to the chamber 45. During such time as the pump 11 is energized and the high pressure pump 12 is de-energized or not operating, only steam will be delivered through the ejector 39 and discharge conduit 50. The check valve 44 in the high pressure conduit 42 prevents steam from moving rearwardly through the passageway 46 toward the high pressure pump 12. Thus, when it is desired to use only steam for cleaning, only the pump 11 is energized.

When it is desired to use hot water in the cleaning process, both pumps 11 and 12 are rendered operative. With the pump 12 operating, water enters the ejector chamber 45 and outlet passageway 49 at a pressure of upwards of 2,000 pounds per square inch. With the pump 11 operating, steam enters the chamber 45 under relatively low pressure in the neighborhood of 90 to 100 pounds per square inch, and is drawn into the outlet passageway 49, there to heat the jet of cold water to a temperature in the neighborhood of 200° F. which represents an effective cleaning temperature. In a preferred embodiment, the high pressure pump 12 delivers liquid to said inlet passageway 46 at a pressure at least ten times the pressure of the fluid delivered to boiler 20.

When it is desired to use the above-described apparatus for cold water rinsing, it is only necessary to open the switch 34 to de-energize the pump 11, and, with the switch 38 closed to energize the high pressure pump 12, only cold water will flow through the ejector 39 and discharge conduit 50 under high pressure to the article to be rinsed. When only cold water is used, the check valve 56 prevents the same from backing up through the conduit 53 toward the boiler 20. Whenever the switch 34 is opened to de-energize the motor 30 and render the pump 11 inoperative, the flow operated switch 27 operates to close the valve 26, so that fuel to the burner 24 is shut off automatically. With this arrangement, the boiler is prevented from becoming overheated, and unnecessary consumption of fuel is avoided.

Figure 3:
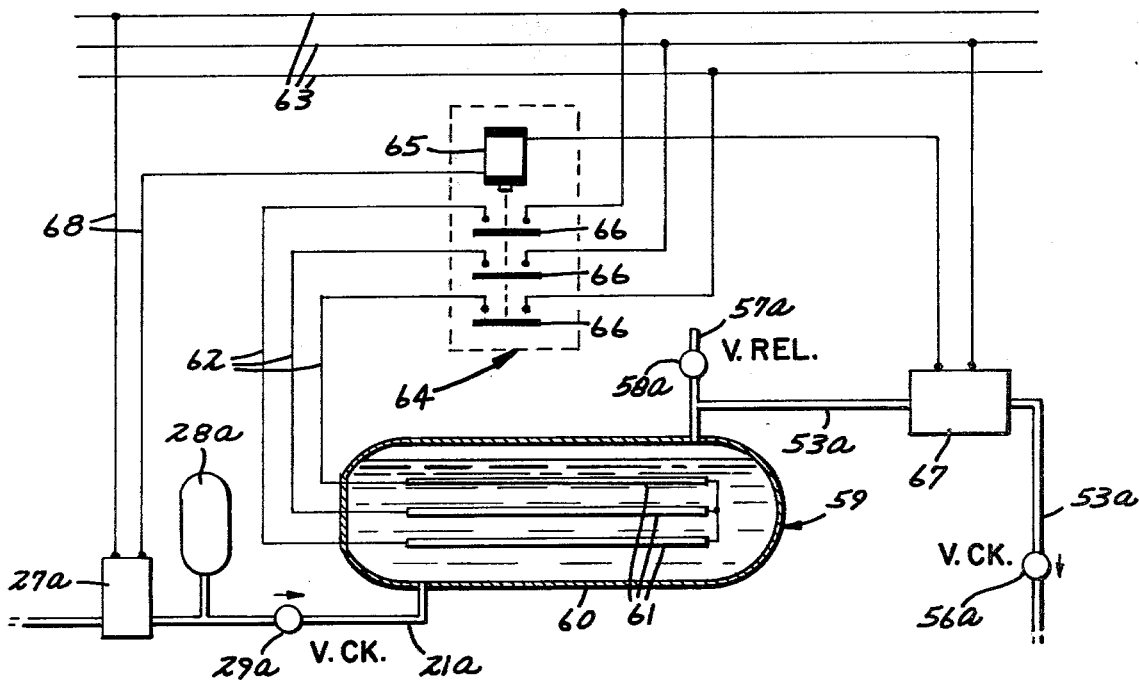
FIG. 3 is a diagrammatic view of a modified arrangement.

In the embodiment illustrated in FIG. 3, a boiler or steam generator is indicated at 59, the same comprising a metallic pressure tank 60 having mounted therein electrical heating elements 61. The elements 61 are connected to power leads 62 that extend to a conventional power line 63. A relay 64 includes a relay coil 65 and switches 66 that are each interposed in a different one of the leads 62. Cold water is supplied to the tank 60 through a low pressure conduit 21a and generated steam is discharged from the tank 60 through a low pressure conduit 53a. Check valves 29a and 56a are interposed in the conduits 21a and 53a respectively, and a surge tank or bottle 28a is connected to the conduit 21a. A branch conduit 57a extends from the low pressure conduit 53 and is provided with a pressure relief valve 58a. It should here be noted that the elements in FIG. 3 with exponents a are identical to those elements of FIG. 1 minus said exponents.

The relay coil 65 is disposed in an electrical circuit in series with a flow operated switch 27a operatively connected in the conduit 21a and a temperature controlled switch, not shown, but contained within a housing 67 on the low pressure conduit 53a. As shown in FIG. 3, the flow operated switch 27a, relay coil 65 and terminals on the switch housing 67 are interposed in a lead 68 opposite ends of which are connected to the power line 63.

The flow operated switch 27a is normally open, and is closed by flow of water through the conduit 21a. The temperature controlled switch within the housing 67 is closed whenever the temperature in the boiler 59 is below a predetermined minimum. Thus, when water is being supplied to the boiler 59, the switch 27a will close. If the temperature of the fluid in the tank 60 is below the desired minimum, the temperature operated switch within the housing 67 will also be closed and the relay coil 65 will be energized to close the switches 66 and cause energization of the heating elements 61.

While I have shown and described two forms of the cleaning system of this invention, it will be understood that the same is capable of further modification without departure from the spirit and scope of the invention, as defined in the claims.

What is claimed is:

1. In a cleaning system:
   (a) a pair of respectively relatively low and relatively high pressure pumps adapted to deliver cold water from a cold water source;
   (b) pump operating means for said pumps;
   (c) control means for said pump operating means;
   (d) a boiler having an inlet and an outlet, said boiler including heating means operable to convert said cold water entering said inlet into steam which is delivered to said outlet;
   (e) first conduit means for delivering said cold water from said low pressure pump to said boiler inlet;
   (f) an ejector including a housing defining a chamber, a relatively small diameter high pressure inlet passageway to one side of said chamber, a relatively large diameter outlet passageway from the opposite side of said chamber and aligned with said high pressure inlet passageway, and a lower pressure inlet passageway to said chamber angularly displaced from said inlet and outlet passageways;
   (g) second conduit means for delivering said cold water from said high pressure pump to said high pressure inlet passageway;
   (h) and third conduit means connecting said boiler outlet to said lower pressure ejector inlet passageway, wherein the pressure of said steam entering the lower pressure inlet passageway of the ejector is substantially relatively lower than the pressure of the cold water entering the high pressure inlet passageway;
   (i) said control means being operative to deliver both said steam and said cold water together, and selectively, said cold water alone and said steam alone, to said ejector chamber.

2. The cleaning system defined in claim 1 in which said outlet passageway has a bell-shaped inner end wall surface portion flaring outwardly from said relatively large diameter of said outlet passageway and opening into said chamber.

3. The cleaning system defined in claim 2 in which said ejector chamber has a cylindrical wall surface between said sides thereof, said lower pressure inlet opening into said chamber through said cylindrical wall surface.

4. The cleaning system defined in claim 1 in which said high pressure pump is disposed to deliver liquid to said inlet passageway at a pressure at least ten times the pressure of fluid delivered to said boiler.

5. The cleaning system defined in claim 1 in which said pump operating means comprises a pair of motors, one for each of said pumps, and power circuits for energizing said motors, said control means including a pair of switches in said power circuits, one for each motor; and in further combination with a conductor for delivering heat producing medium to said boiler, and means responsive to flow of water from said low pressure pump to said boiler for controlling said delivery of heat producing medium to said boiler.

6. The cleaning system defined in claim 5 in which said boiler includes a burner for fluid fuel, said conductor comprising a pipe for said fluid fuel, said last mentioned means comprising a flow operated switch controlled by said flow of water from said low pressure pump and a valve connected to said pipe and controlled by said flow operated switch.

7. The cleaning system defined in claim 5 in which said boiler includes an electrically operated heating element in said boiler, said conductor comprising electrical wires for delivery of electrical power to said heating element, said means for controlling delivery of heat producing medium to said boiler comprising a relay including switch means for said electrical wires, and a flow operated switch controlled by said flow of water from said low pressure pump and operatively connected to said relay.

8. The cleaning system defined in claim 7 in which said means for controlling delivery of heat producing medium includes a temperature controlled switch operatively connected to said boiler outlet and connected in a circuit in series with said flow operated switch and said relay.

* * * * *